(12) United States Patent
Beristany et al.

(10) Patent No.: US 12,155,190 B2
(45) Date of Patent: Nov. 26, 2024

(54) REPAIR CLIPS FOR GANG BOXES AND ELECTRICAL ASSEMBLIES HAVING SUCH REPAIR CLIPS

(71) Applicant: Hubbell Incorporated, Shelton, CT (US)

(72) Inventors: Victor Beristany, South Bend, IN (US); Krzysztof Wojciech Korcz, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/149,595

(22) Filed: Jan. 3, 2023

(65) Prior Publication Data

US 2023/0275412 A1 Aug. 31, 2023

Related U.S. Application Data

(60) Provisional application No. 63/313,795, filed on Feb. 25, 2022.

(51) Int. Cl.
*H02G 3/08* (2006.01)
(52) U.S. Cl.
CPC .................................. *H02G 3/081* (2013.01)
(58) Field of Classification Search
CPC ..................................................... H02G 3/081
See application file for complete search history.

(56) References Cited

U.S. PATENT DOCUMENTS

| | | | |
|---|---|---|---|
| 5,823,821 A * | 10/1998 | Tohanczyn, Jr. | H02G 3/086 174/53 |
| 8,087,862 B1 | 1/2012 | Smith | |
| 10,116,128 B1 | 10/2018 | Loughlin | |
| 2007/0209818 A1* | 9/2007 | Forrest | H02G 3/16 174/50 |
| 2008/0207047 A1* | 8/2008 | Walton | H02G 3/121 439/538 |
| 2008/0217054 A1* | 9/2008 | Walton | H02G 3/18 174/545 |
| 2014/0182089 A1 | 7/2014 | Jakob | |
| 2017/0268559 A1 | 9/2017 | Wilusz et al. | |

* cited by examiner

*Primary Examiner* — Hung V Ngo
(74) *Attorney, Agent, or Firm* — Ruggiero McAllister & McMahon LLC (57) ABSTRACT

A repair clip for a gang box with a damaged threaded opening is provided. The repair clip includes a top wall, a front wall, and a rear wall. The top wall has a replacement opening that is positionable over the damaged threaded opening. The front wall has a leg depends from the top wall at a front shoulder region. The front wall and/or the front shoulder region are elastically deformable so as to apply a clamping force on an inner wall of the gang box. The rear wall depends from the top wall at a rear shoulder region, the rear wall and/or the rear shoulder region being elastically deformable so as to apply a clamping force on an outer wall of the gang box. The replacement opening is elongated in a direction between the front and rear walls.

16 Claims, 8 Drawing Sheets

REPAIR CLIPS FOR GANG BOXES AND ELECTRICAL ASSEMBLIES HAVING SUCH REPAIR CLIPS

CROSS REFERENCE TO RELATED APPLICATIONS

This application claims the benefit of U.S. Application 63/313,795, filed Feb. 25, 2022, the entire contents of which are incorporated by reference herein.

BACKGROUND

1. Field of the Invention

The present disclosure is related to gang boxes and electrical assemblies. More particularly, the present disclosure is related to repair clips for gang boxes.

2. Description of Related Art

Gang boxes are used in commercial and residential construction to house electrical connections between power conductors and electrical devices within the wall. The electrical devices can include, but are not limited to, one or more of switch, an outlet, a blank cover plate, and others.

The gang box typically includes one or more threaded connections that are used to secure the electrical device to the gang box via screws. The gang boxes are made of metallic or polymeric materials that lead to inadvertent damage—via stripping and/or cross threading—of the threaded connection.

The gang boxes are often secured in the wall in a manner that makes removal or replacement of the gang box difficult without damaging the wall material (i.e., drywall, paneling, and others). Stated differently, replacing a gang box with a damaged threaded connector can increase the time, expense, and materials necessary to return the electrical device to normal service.

Accordingly, it has been found that there is a need for repair clips configured to repair the threaded connections of damaged gang boxes without the expense and difficulty of removing and replacing the damaged gang box.

SUMMARY

A repair clip for a gang box with a damaged threaded opening is provided. The repair clip includes a top wall, a front wall, and a rear wall. The top wall has a replacement opening that is positionable over the damaged threaded opening. The front wall has a leg depends from the top wall at a front shoulder region. The front wall and/or the front shoulder region are elastically deformable so as to apply a clamping force on an inner wall of the gang box. The rear wall depends from the top wall at a rear shoulder region, the rear wall and/or the rear shoulder region being elastically deformable so as to apply a clamping force on an outer wall of the gang box. The replacement opening is elongated in a direction between the front and rear walls.

In some embodiments either alone or together with any one or more of the aforementioned and/or after-mentioned embodiments, the replacement opening has an inner edge that is perpendicular to or tapered downward from the top wall.

In some embodiments either alone or together with any one or more of the aforementioned and/or after-mentioned embodiments, the leg includes a pair of legs spaced from one another to define a relief therebetween.

In some embodiments either alone or together with any one or more of the aforementioned and/or after-mentioned embodiments, the relief is sized and positioned such that, when the repair clip is installed on the gang box, the pair of legs are positioned on opposite sides of the damaged threaded opening.

In some embodiments either alone or together with any one or more of the aforementioned and/or after-mentioned embodiments, the front shoulder includes a structural rib that provides a spring force to the leg.

In some embodiments either alone or together with any one or more of the aforementioned and/or after-mentioned embodiments, the leg includes an end that is tapered or bent away from the rear wall, the end having an inner surface configured to act as a cam surface on the gang box during installation to elastically deform or bend the front wall.

In some embodiments either alone or together with any one or more of the aforementioned and/or after-mentioned embodiments, the rear wall includes an end that is tapered or bent away from the front wall, the end having an inner surface configured to act as a cam surface on the gang box during installation to elastically deform or bend the rear wall.

In some embodiments either alone or together with any one or more of the aforementioned and/or after-mentioned embodiments, the rear wall further includes a barb facing towards the front wall so that the barb digs into the gang box to mitigate removal of the repair clip from the gang box.

In some embodiments either alone or together with any one or more of the aforementioned and/or after-mentioned embodiments, the rear wall further includes an alignment feature that is sized and positioned to receive a tool to bias the rear wall away from the gang box and to move the repair clip so as to align the replacement opening over the damaged threaded opening.

In some embodiments either alone or together with any one or more of the aforementioned and/or after-mentioned embodiments, the alignment feature is positioned in the rear wall proximate the rear shoulder region and the top wall.

A repair clip for a gang box with a damaged threaded opening is provided. The repair clip includes a top wall, a front wall, and a rear wall. The top wall has a replacement opening that is positionable over the damaged threaded opening. The front wall has a leg that depends from the top wall at a front shoulder region. The front wall and/or the front shoulder region is elastically deformable so as to apply a clamping force on an inner wall of the gang box. The rear wall depends from the top wall at a rear shoulder region. The rear wall and/or the rear shoulder region is elastically deformable so as to apply a clamping force on an outer wall of the gang box. The rear wall includes an alignment feature that is sized and positioned to receive a tool to bias the rear wall away from the gang box and to move the repair clip so as to align the replacement opening over the damaged threaded opening. The alignment feature is positioned in the rear wall proximate the rear shoulder region and the top wall.

In some embodiments either alone or together with any one or more of the aforementioned and/or after-mentioned embodiments, the replacement opening is elongated in a direction between the front and rear walls.

In some embodiments either alone or together with any one or more of the aforementioned and/or after-mentioned embodiments, the replacement opening has an inner edge that is perpendicular to or tapered downward from the top wall.

In some embodiments either alone or together with any one or more of the aforementioned and/or after-mentioned embodiments, the leg includes a pair of legs spaced from one another to define a relief therebetween, the relief being sized and positioned such that, when the repair clip is installed on the gang box, the pair of legs are positioned on opposite sides of the damaged threaded opening.

In some embodiments either alone or together with any one or more of the aforementioned and/or after-mentioned embodiments, the leg includes an end that is tapered or bent away from the rear wall and the rear wall includes an end that is tapered or bent away from the front wall, the ends having inner surfaces configured to act as a cam surface on the gang box during installation to elastically deform or bend the front and rear walls, respectively.

In some embodiments either alone or together with any one or more of the aforementioned and/or after-mentioned embodiments, the rear wall further includes a barb facing towards the front wall so that the barb digs into the gang box to mitigate removal of the repair clip from the gang box.

An electrical assembly is provided that includes a gang box, a repair clip, an electrical device, and a screw. The gang box has a threaded opening with a damaged thread. The repair clip has a top wall with a replacement opening that is positioned over the threaded opening. The front wall has a pair of legs that depend from the top wall so as to apply a clamping force on an inner wall of the gang box. The rear wall depends from the top wall so as to apply a clamping force on an outer wall of the gang box. The electrical device in the gang box. The screw is through the electrical device, is threadably engaged with the replacement opening, and is in the threaded opening. The replacement opening is elongated in a direction between the front and rear walls. The rear wall includes an alignment feature that is sized and positioned to receive a tool to bias the rear wall away from the gang box and to move the repair clip so as to align the replacement opening over the damaged threaded opening. The alignment feature is positioned in the rear wall proximate the rear shoulder region and the top wall.

In some embodiments either alone or together with any one or more of the aforementioned and/or after-mentioned embodiments, the repair clip is a stamped, molded, or cast metallic component.

In some embodiments either alone or together with any one or more of the aforementioned and/or after-mentioned embodiments, the repair clip and/or the gang box are made of a metallic material or a polymeric material.

In some embodiments either alone or together with any one or more of the aforementioned and/or after-mentioned embodiments, the replacement opening has an inner edge that is perpendicular to or tapered downward from the top wall.

The above-described and other features and advantages of the present disclosure will be appreciated and understood by those skilled in the art from the following detailed description, drawings, and appended claims.

DETAILED DESCRIPTION

Referring to the drawings and in particular with simultaneous reference to FIGS. 1-8, an exemplary embodiment of a repair clip according to the present disclosure is shown and is generally referred to by reference numeral 10.

Advantageously, clip 10 is easily securable to a gang box 12 over a damaged threaded opening 14 of the box in a manner that allows an electrical device 16 to be secured to the box with a screw 18 through the clip 10 and opening 14. Electrical device 16 can include, but is not limited to, a switch, an outlet, a blank cover plate, and others.

When installed, clip 10, box 12, device 16, and screw 18 define an assembly that can, in some embodiments, further include a cover (not shown) over portions the electrical device.

In the illustrated embodiment, clip 10 is shown as a stamped metallic component. Of course, it is contemplated by the present disclosure for clip 10 to be stamped, molded, or cast into shape and/or for the clip to be made of any metallic material, polymeric material, or combinations thereof.

In the illustrated embodiment, box 12 is shown as a non-metallic material. Of course, it is contemplated by the present disclosure for clip 10 to find equal use with gang boxes 12 formed of any desired material that can lead to stripping or damage to threaded opening 14.

Clip 10 has a front wall 20, a top wall 22, and a rear wall 24. Clip 10, when installed on box 12, is positioned with front wall 20 in the box, with top wall 22 positioned over threaded opening 14 of the box, and rear wall 24 outside of the box.

Figure 6:
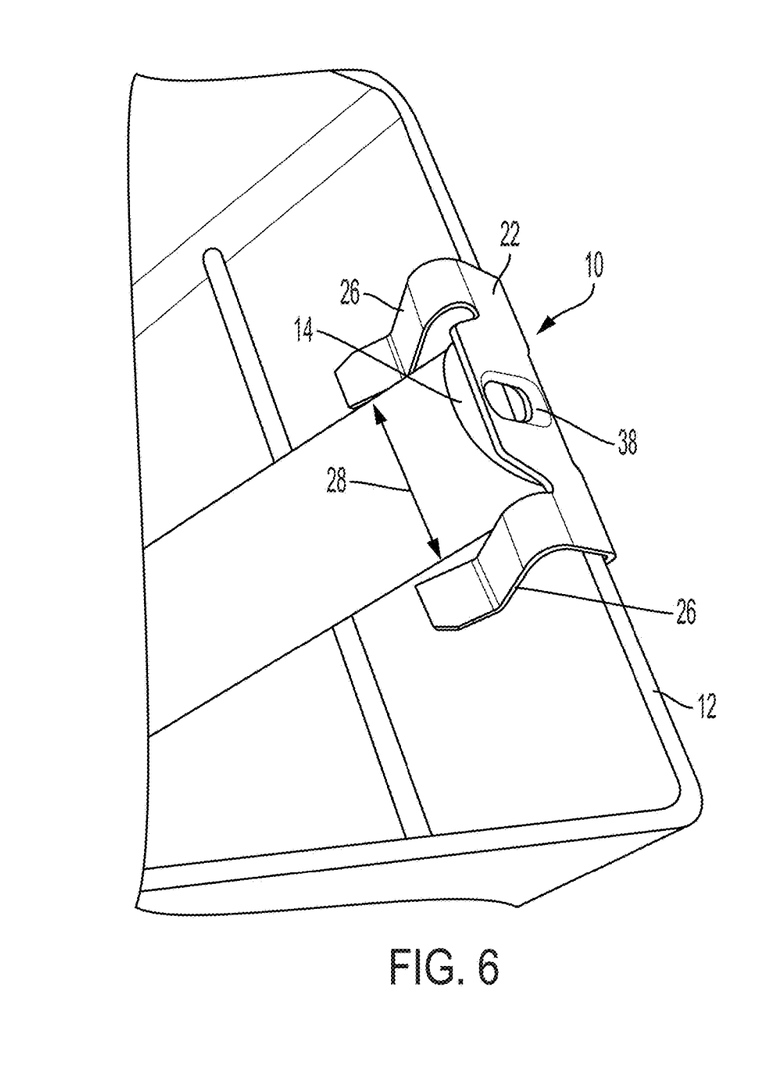
FIG. 6 is a front view of the installed repair clip of FIG. 5.

Front wall 20 can include one or more legs 26 (two shown). In the illustrated embodiment, legs 26 are spaced from one another to define a relief 28. Relief 28 is sized and positioned such that, when clip 10 is installed on box 12, legs 26 are positioned on opposite sides of threaded opening 14. Thus and as best seen in FIG. 6, clip 10 when installed on box 12 includes only legs 26 protruding into the internal volume of the box but in a manner that avoids interference with electrical devices or electrical connections within the box.

Each leg 26 depends from top wall 22 at a front shoulder region 30. Shoulder regions 30 and/or legs 26 are defined to allow the legs to elastically deform or bend as clip 10 is pushed onto box 12 and to provide a clamping force once positioned on the box.

Shoulder region 30 can include a structural rib 32. Rib 32 is shown positioned on clip 10 to protrude away from box 12. Of course, it is contemplated by the present disclosure for rib 32 to be an indentation extending inward toward box 12. Rib 32 provides additional strength and/or spring force to clip 10 in the region of shoulder 30 so that legs 26 maintain the clip in the installed position on box 12.

Legs 26 include an end 34 that is tapered or bent away from rear wall 24. In this manner, an inner surface 36 of end 34 can act as a cam surface on box 12 during installation to elastically deform or bend front wall 20 (e.g., legs 26) at shoulder 30.

Top wall 22 includes a replacement opening 38 that is configured to threadably engage screw 18 so as to secure electrical device 16 to clip 10 with the clip secured to box 12.

Figure 1:
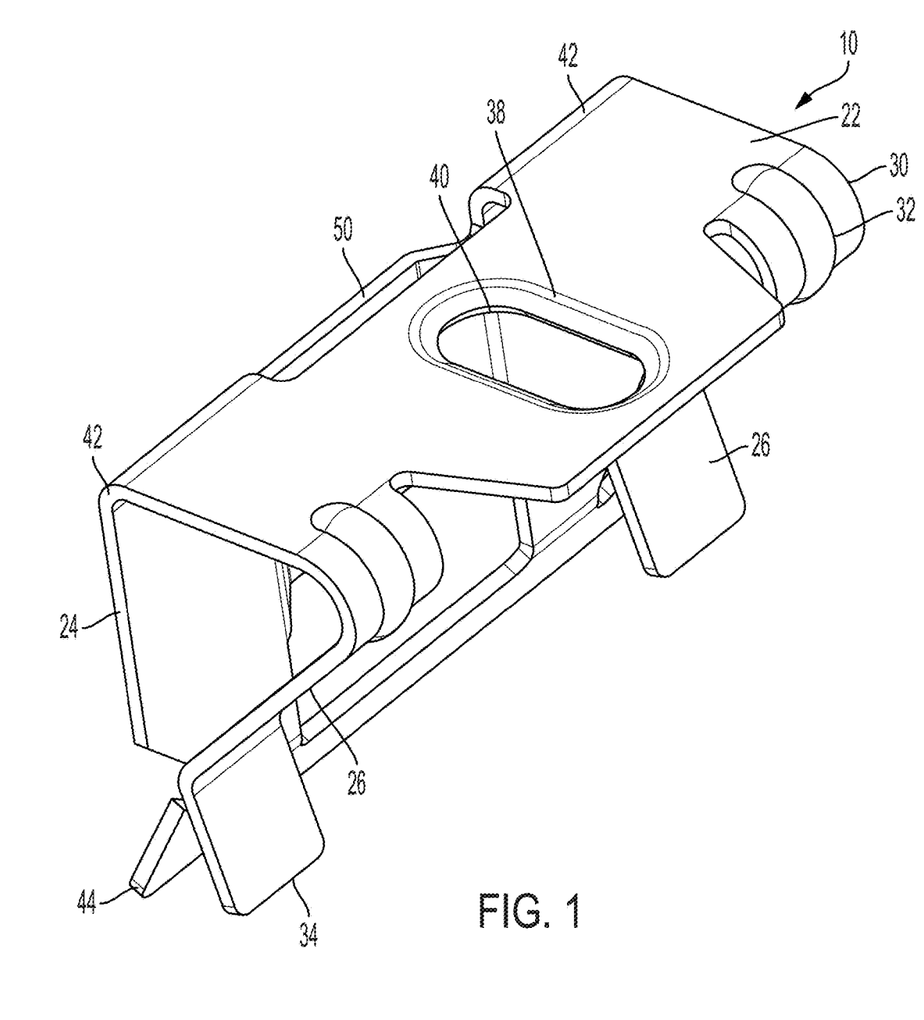
FIGS. 1 and 2 are front perspective views of repair clips according to the present disclosure.
Figure 2:
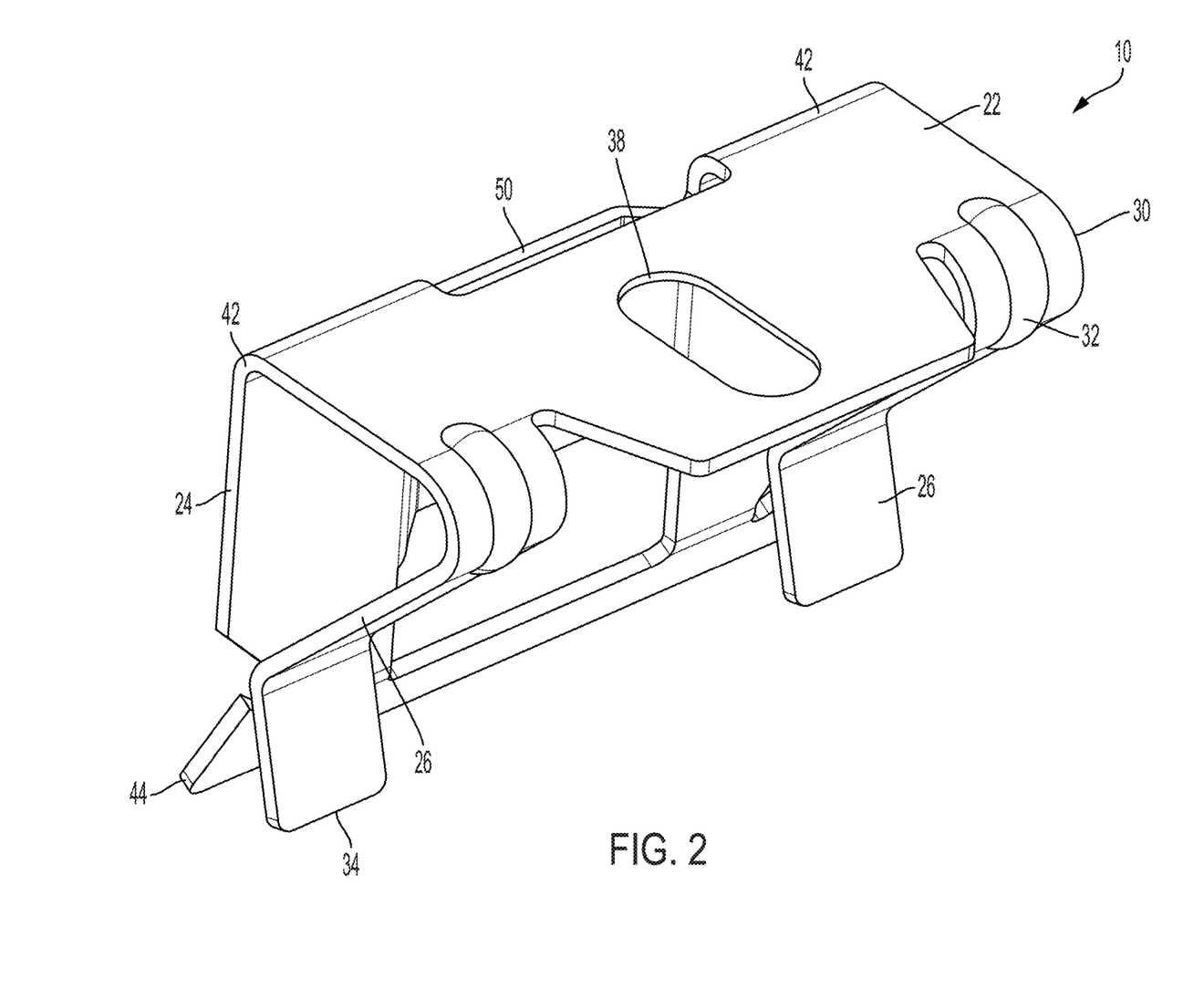
Figure 3:
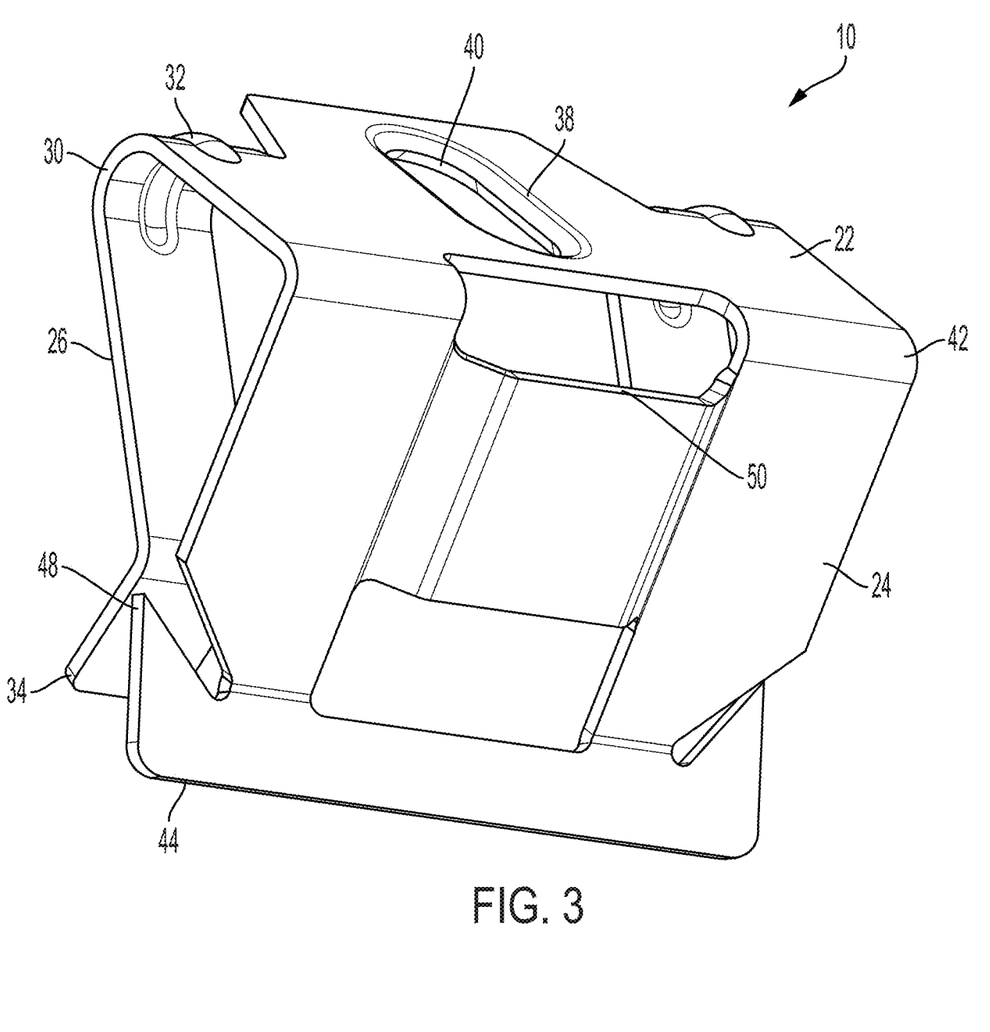
FIG. 3 is a rear perspective view of the repair clip of FIG. 1.
Figure 4:
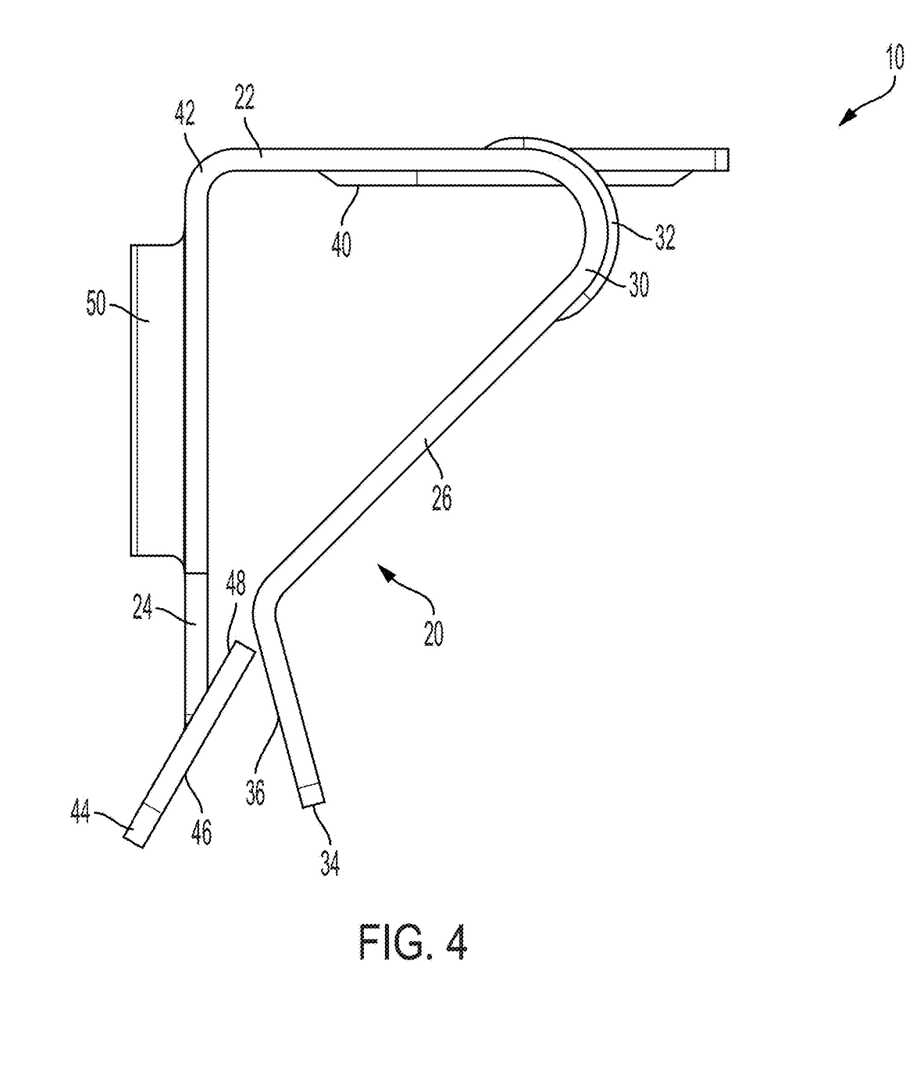
FIG. 4 is a side view of the repair clip of FIG. 1.

Replacement opening 38 can have an inner edge 40 that is perpendicular to top wall 22 as shown in FIG. 2. In other embodiments, replacement opening 38 can have inner edge 40 that is tapered downward from top wall 22 as shown in FIG. 1. In embodiments where clip is a stamped metallic clip, inner edge 40 can be bent inward during or after formation replacement opening 38.

Without wishing to be bound by any particular theory, inner edge 40 is believed to elongate the interconnection between clip 10 and screw 18. Stated differently, clip 10 at least in part due to inner edge 40 can engage more than one thread of screw 18 to more securely engage the screw.

It has been determined by the present disclosure that the position of threaded opening 14 on box 12 can vary due to, for example, manufacturing tolerances, manufacturer specifications, and different box designs. Thus in some embodiments, clip 10 is configured with replacement opening 38 elongated in a direction between front and rear walls 20, 24. It has been found that the elongation of replacement opening 38 can adapt clip 10 for use with a wider variety of gang boxes 12—due to the variable positioning of threaded opening 14—than previously possible.

It might be expected that threading of screw 18 into elongated opening 38 would lead to the screw wandering or moving within the elongated opening. However, it has been found by the present disclosure that, in use, the damaged threaded opening 14 in box 12 can receive screw 18 in a manner that centers the screw in the elongated opening during the threaded connection, which prevents such wandering.

Rear wall 24 depends from top wall 22 at a rear shoulder region 42. Rear wall 24 and/or shoulder regions 42 are defined to allow the rear wall to elastically deform or bend as clip 10 is pushed onto box 12 and to provide a clamping force once positioned on the box.

Rear wall 24 can include an end 44 that is tapered or bent away from front wall 20. In this manner, an inner surface 46 of end 44 can act as a cam surface on box 12 during installation to elastically deform or bend shoulder 42.

Figure 5:
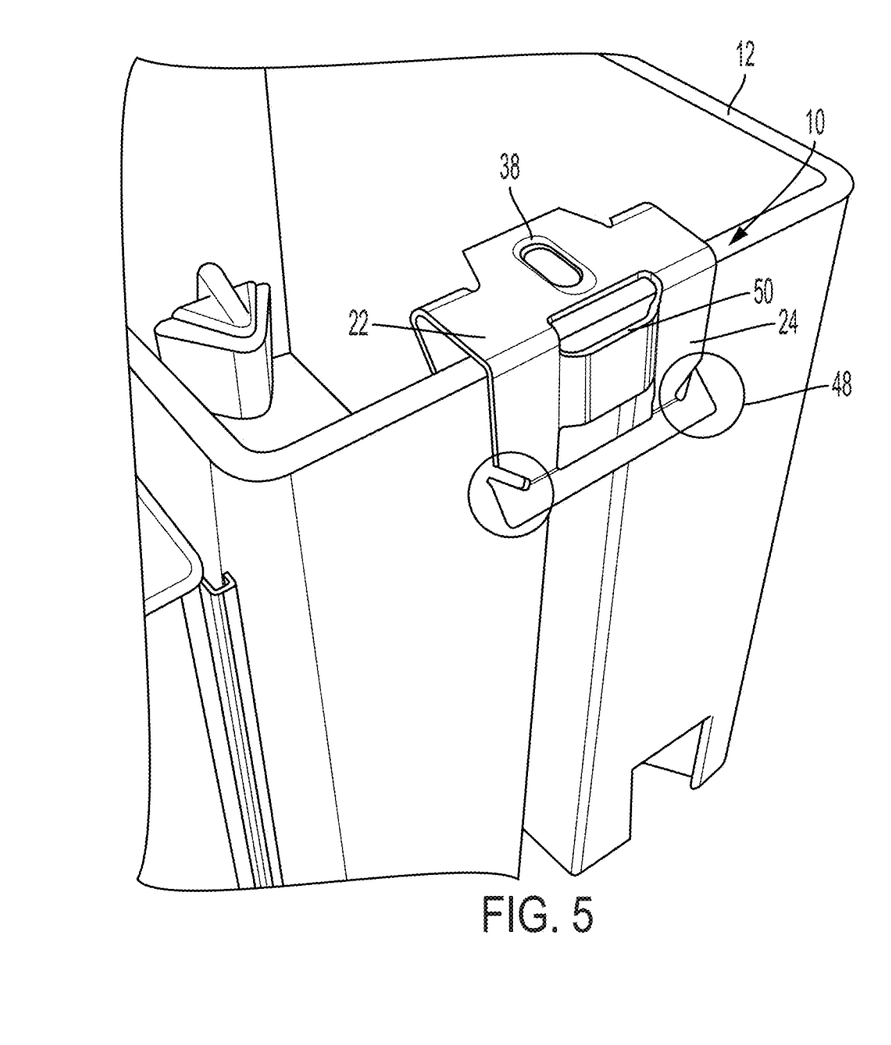
FIG. 5 is a rear view of the repair clip of FIG. 1 in an installed position on a gang box.

In some embodiments, rear wall 24 can further include one or more sharp ends or barbs 48. Barbs 48 can be positioned on end 44 facing towards front wall 20 so that, when clip 10 is installed on box 12, the barbs can dig into the box to mitigate removal of the clip from the box as best seen in FIG. 5.

Figure 7:
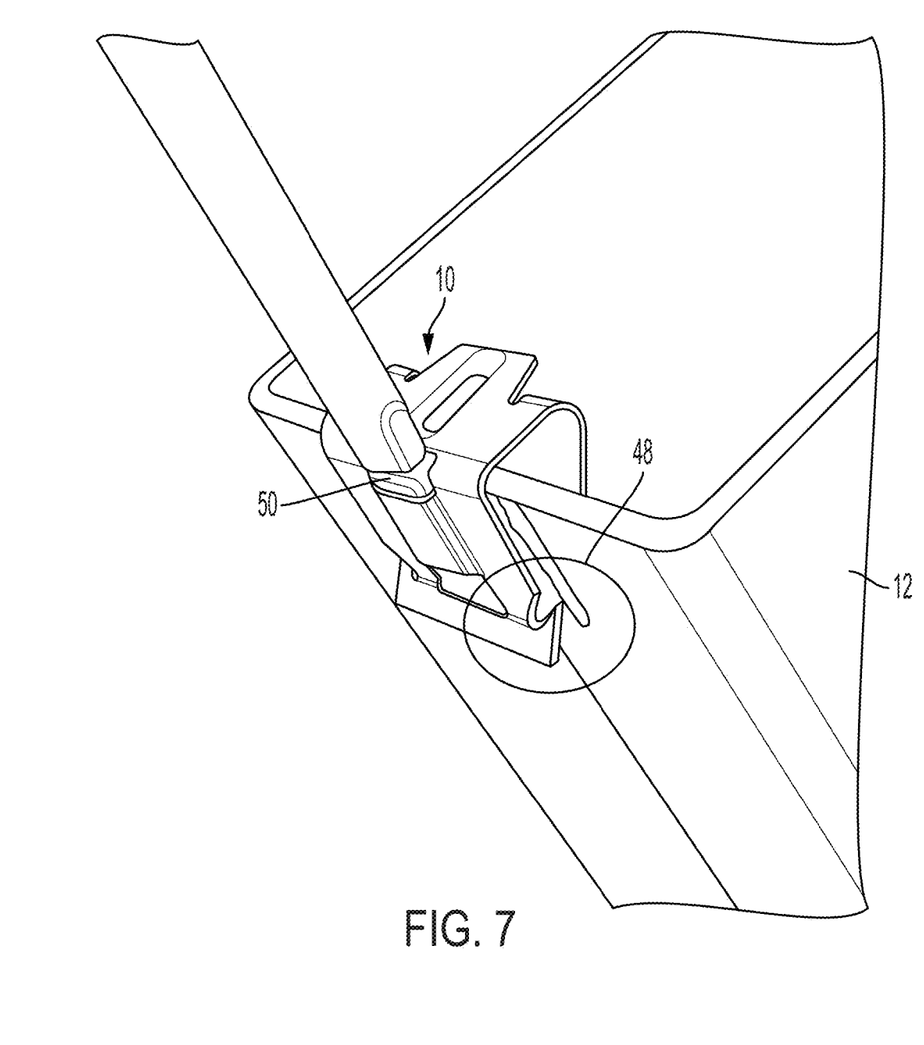
FIG. 7 is a rear view of the installed repair clip of FIG. 5 during an alignment process.
Figure 8:
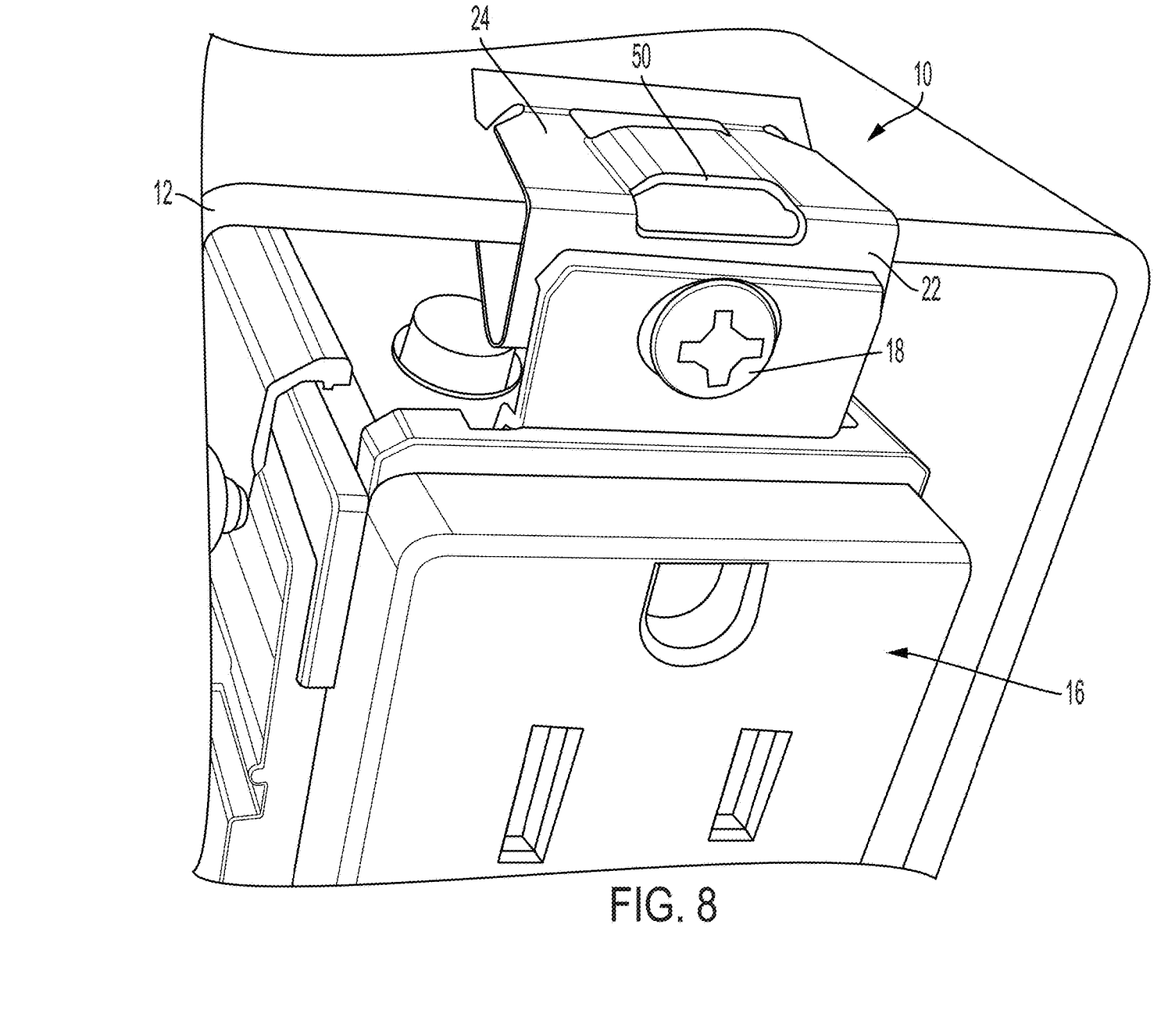
FIG. 8 is a rear view of the repair clip in use connecting an electrical device to the gang box.

Rear wall 24 can include an alignment feature 50 that is sized and positioned to receive a tool such as but not limited a flat head screw driver as shown in FIG. 7. In this position, the tool can be engaged in alignment feature 50 to first bias rear wall 24—and when present barbs 48—away from box 12, then to move the clip so as to align replacement opening 38 over threaded opening 14.

Stated differently, the installation of clip 10 on box 12—particularly in view of relief 28 between legs 26—can result in replacement opening 38 not being centered over threaded opening 14. Thus, alignment feature 50 can be used to both relieve the clamping pressure of clip 10 on box 12 and to move the clip to align replacement and threaded openings 38, 14.

It should be recognized that clip 10 is disclosed by way of example only as having alignment feature 50 configured for use with a flat head screw driver. Of course, it is contemplated by the present disclosure for alignment feature 50 to be configured to receive other tools such as, but not limited to, the head of a Phillips head screw driver, a portion of a wire clipping or stripping tool, any other common electrician tool, and a specifically designed tool.

In some embodiments, alignment feature 50 is positioned at the upper side of clip 10—namely proximate shoulder 32 and top wall 22 so that the tool can engage the feature and be used to relieve the clamping pressure of clip 10 on box 12 without damage to the wall material.

Without wishing to be bound by any particular theory, existing solutions for repairing damaged threaded connectors on installed gang boxes are too large or bulky, resulting in excessive damage to the wall, are limited in the gang box configurations they can be used with, and can be too difficult to properly align to the damaged opening. Clip 10 resolves and/or mitigates these and other deleterious attributes of prior art solutions with a simple, easy to make, easy to install, and easy to align structure with high holding forces on the gang box.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST repair clip 10
gang box 12
threaded opening 14
electrical device 16
screw 18
front wall 20
top wall 22
rear wall 24
legs 26
relief 28
front shoulder region 30
structural rib 32
end 34
inner surface 36
replacement opening 38
inner edge 40
rear shoulder region 42
end 44
inner surface 46
barbs 48
alignment feature 50

What is claimed is:

1. A repair clip for a gang box with a damaged threaded opening, the repair clip comprising:
   a top wall having a replacement opening that is positionable over the damaged threaded opening;
   a front wall having a leg depending from the top wall at a front shoulder region, the front wall and/or the front shoulder region being elastically deformable so as to apply a clamping force on an inner wall of the gang box; and
   a rear wall depending from the top wall at a rear shoulder region, the rear wall and/or the rear shoulder region being elastically deformable so as to apply a clamping force on an outer wall of the gang box, the rear wall with an end and a barb, the end being tapered or bent away from the front wall and an inner surface being configured to act as a cam surface on the gang box during installation to elastically deform or bend the rear wall, the barb being distanced from the end and facing towards the front wall so that the barb digs into the gang box to mitigate removal of the repair clip from the gang box,
   wherein the replacement opening is elongated in a direction between the front and rear walls, and
   wherein the rear wall further comprises an alignment feature that is sized and positioned to receive a tool to bias the rear wall away from the gang box and to move the repair clip so as to align the replacement opening over the damaged threaded opening.

2. The repair clip of claim 1, wherein the replacement opening has an inner edge that is perpendicular to the top wall.

3. The repair clip of claim 1, wherein the replacement opening has an inner edge that is tapered downward from the top wall.

4. The repair clip of claim 1, wherein the leg comprises a pair of legs spaced from one another to define a relief therebetween.

5. The repair clip of claim 4, wherein the relief is sized and positioned such that, when the repair clip is installed on the gang box, the pair of legs are positioned on opposite sides of the damaged threaded opening.

6. The repair clip of claim 1, wherein the front shoulder comprises a structural rib that provides a spring force to the leg.

7. The repair clip of claim 1, wherein the alignment feature is positioned in the rear wall proximate the rear shoulder region and the top wall.

8. A repair clip for a gang box with a damaged threaded opening, the repair clip comprising:
   a top wall having a replacement opening that is positionable over the damaged threaded opening;
   a front wall having a leg depending from the top wall at a front shoulder region, the front wall and/or the front shoulder region being elastically deformable so as to apply a clamping force on an inner wall of the gang box; and
   a rear wall depending from the top wall at a rear shoulder region, the rear wall and/or the rear shoulder region being elastically deformable so as to apply a clamping force on an outer wall of the gang box,
   wherein the rear wall comprises an alignment feature that is sized and positioned to receive a tool to bias the rear wall away from the gang box and to move the repair clip so as to align the replacement opening over the damaged threaded opening, the alignment feature being positioned in the rear wall proximate the rear shoulder region and the top wall.

9. The repair clip of claim 8, wherein the replacement opening is elongated in a direction between the front and rear walls.

10. The repair clip of claim 8, wherein the replacement opening has an inner edge that is perpendicular to or tapered downward from the top wall.

11. The repair clip of claim 8, wherein the leg comprises a pair of legs spaced from one another to define a relief therebetween, the relief being sized and positioned such that, when the repair clip is installed on the gang box, the pair of legs are positioned on opposite sides of the damaged threaded opening.

12. The repair clip of claim 8, wherein the leg comprises an end that is tapered or bent away from the rear wall and the rear wall comprises an end that is tapered or bent away from the front wall, the ends having inner surfaces configured to act as a cam surface on the gang box during installation to elastically deform or bend the front and rear walls, respectively.

13. The repair clip of claim 8, wherein the rear wall further comprises a barb facing towards the front wall so that the barb digs into the gang box to mitigate removal of the repair clip from the gang box.

14. An electrical assembly, comprising:
   a gang box having a threaded opening with a damaged thread;
   a repair clip having a top wall with a replacement opening that is positioned over the threaded opening, a front wall having a pair of legs depending from the top wall so as to apply a clamping force on an inner wall of the gang box, and a rear wall depending from the top wall so as to apply a clamping force on an outer wall of the gang box,
   an electrical device in the gang box; and
   a screw through the electrical device, threadably engaged with the replacement opening, and in the threaded opening, and
   wherein the rear wall comprises an alignment feature that is sized and positioned to receive a tool to bias the rear wall away from the gang box and to move the repair clip so as to align the replacement opening over the damaged threaded opening, the alignment feature being positioned in the rear wall proximate the rear shoulder region and the top wall.

15. The electrical assembly of claim 14, wherein the repair clip is a stamped, molded, or cast metallic component.

16. The electrical assembly of claim 14, wherein the repair clip and/or gang box are made of a metallic material or a polymeric material.

* * * * *